(12) United States Patent
Zhang et al.

(10) Patent No.: US 9,336,156 B2
(45) Date of Patent: May 10, 2016

(54) METHOD AND APPARATUS FOR CACHE LINE STATE UPDATE IN SECTORED CACHE WITH LINE STATE TRACKER

(71) Applicants: Zhongying Zhang, Portland, OR (US); Erik G. Hallnor, Beaverton, OR (US); Stanley S. Kulick, Portland, OR (US); Jeffrey L. Miller, Vancouver, WA (US)

(72) Inventors: Zhongying Zhang, Portland, OR (US); Erik G. Hallnor, Beaverton, OR (US); Stanley S. Kulick, Portland, OR (US); Jeffrey L. Miller, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 347 days.

(21) Appl. No.: 13/827,271

(22) Filed: Mar. 14, 2013

(65) Prior Publication Data

US 2014/0281251 A1 Sep. 18, 2014

(51) Int. Cl.
*G06F 12/08* (2006.01)

(52) U.S. Cl.
CPC ........ *G06F 12/0891* (2013.01); *G06F 12/0804* (2013.01); *G06F 12/0815* (2013.01); *G06F 12/0826* (2013.01); *G06F 12/0864* (2013.01); *G06F 12/0895* (2013.01); *G06F 2212/60* (2013.01)

(58) Field of Classification Search
CPC ............ G06F 12/0891; G06F 12/0815; G06F 12/0813; G06F 12/0811; G06F 12/0831; G06F 12/0826; G06F 12/0864; G06F 12/0895; G06F 2212/622; G06F 2212/60

See application file for complete search history.

(56) References Cited

U.S. PATENT DOCUMENTS

| 7,797,495 | B1 * | 9/2010 | Lepak .................. G06F 12/0824 711/141 |
|---|---|---|---|
| 2003/0154345 | A1 * | 8/2003 | Lyon ............................ 711/122 |
| 2004/0068616 | A1 * | 4/2004 | Tierney et al. ................ 711/141 |
| 2004/0215900 | A1 * | 10/2004 | Guthrie et al. ................ 711/146 |

FOREIGN PATENT DOCUMENTS

EP 432524 A2 * 6/1991

* cited by examiner

*Primary Examiner* — Mark Giardino, Jr.
*Assistant Examiner* — Glenn Gossage
(74) *Attorney, Agent, or Firm* — Lowenstein Sandler LLP

(57) ABSTRACT

A processing device and method for cache control including tracking updates to the line state of a cache superline are described. In response to a request pertaining to a superline, a cache controller of the processing device can perform one or more read-modify-write (RMW) operations to (a) a line state vector of a line state array and (b) a counter of the line state array. Based on a determination that one or more requests to the superline have completed, the line state vector from the line state array can be written to a tag array. The cache controller can track pending line state updates to a superline outside of the tag array, and a line state update can occur in the cache controller, rather than awaiting completion of all outstanding operations on a superline. Updates to multiple line states can be maintained simultaneously, and up-to-date ECCs computed.

24 Claims, 10 Drawing Sheets

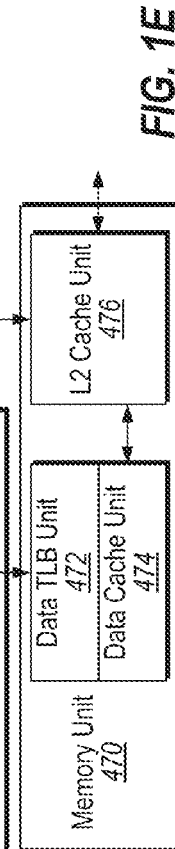
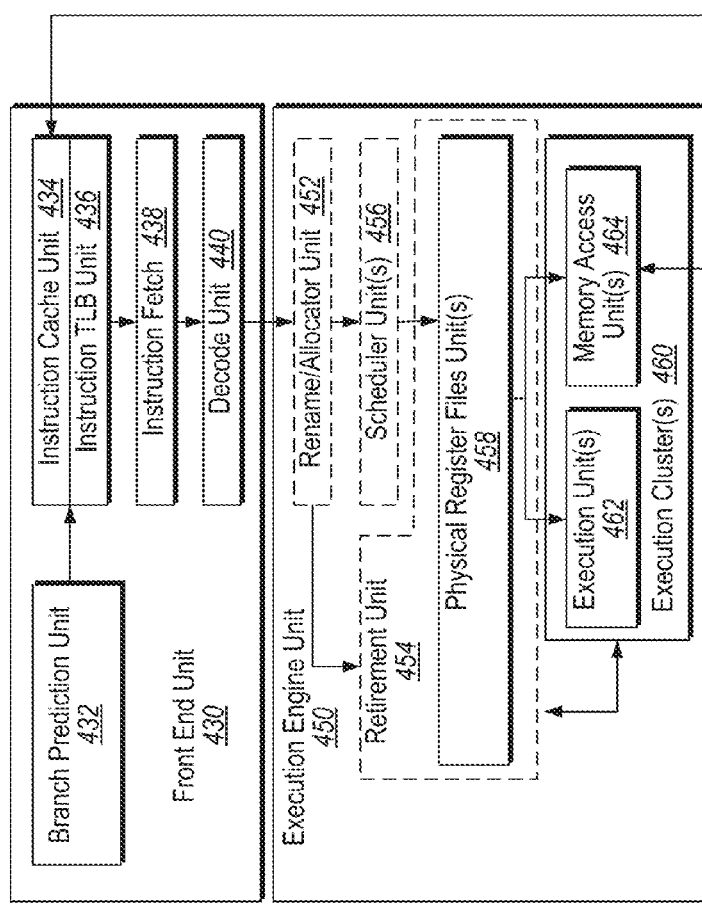

METHOD AND APPARATUS FOR CACHE LINE STATE UPDATE IN SECTORED CACHE WITH LINE STATE TRACKER

TECHNICAL FIELD

Embodiments described herein generally relate to processing devices and, more specifically, relate to implementing a line state tracker.

BACKGROUND

A very large cache (EDRAM or embedded DRAM (dynamic random access memory)) can be implemented as a sector cache to reduce the size of a tag used to access cache lines. With a sector size of 1K-byte block (known as a 'superline') that contains 16 consecutive 64-byte cache lines, the tag size can be reduced by a factor of 16 compared to a non-sectored design. Line state of each cache line also needs to be in the tag. Thus, to further reduce storage size in the tag array, instead of having a line state error correction code(s) (ECC) generated for each individual cache line, all cache line states in a superline can be combined into a 32-bit line state vector with one ECC, thereby reducing total ECC bits for line states in a superline from 4×16=64 bits to 7 bits.

With combined line state, line state update becomes rather complex. Line state ECC needs to be recalculated whenever line state in one of 16 cache lines in a superline changes. The line state update requires a read-modify-write (RMW) operation to merge the new line state into line state vector and recalculate its ECC. Performing RMW requires high power logic and is not possible to be done in the tag array with small signal array (SSA) design. In addition, the line state update should be serialized to ensure new state and ECC correctly pass from previous update to the next.

BRIEF DESCRIPTION OF THE DRAWINGS

FIG. 1D illustrates elements of a processor micro-architecture according to one embodiment.

FIG. 1E illustrates elements of a processor micro-architecture according to one embodiment.

DESCRIPTION OF EMBODIMENTS

Figure 1A:
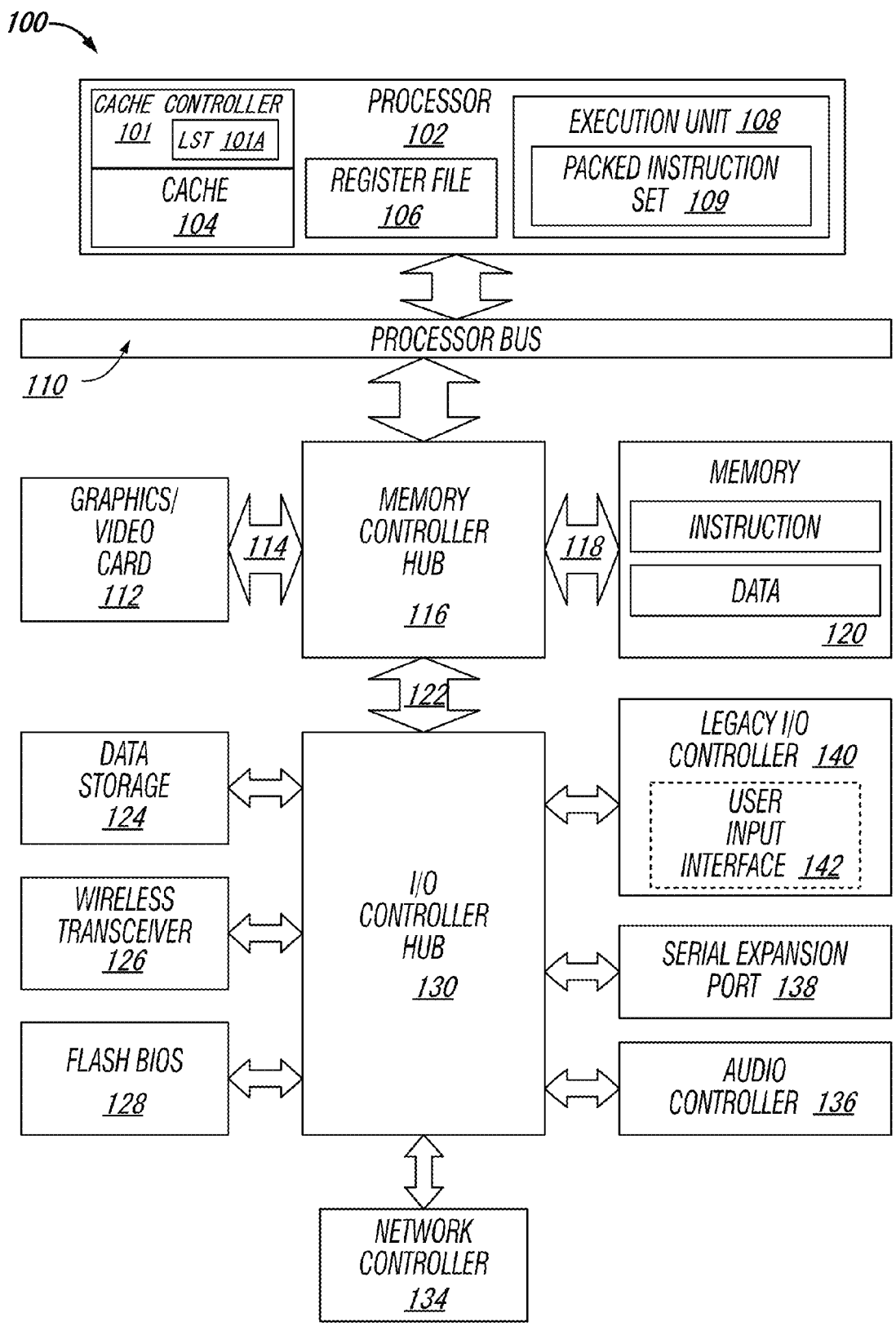
FIG. 1A is a block diagram of one embodiment of a system for implementing a line state tracker.

Technologies for tracking updates to the line state of a cache superline are described. As described herein, a cache controller can be implemented to track pending line state updates to a superline outside of a tag array, allowing multiple line state updates to occur in parallel and thereby minimizing any performance impact from sector design. In doing so, a relatively small array can keep track of operations to the line state of a superline. When a state update to a particular cache line is received, the update can occur immediately in the cache controller, rather than awaiting the completion of all outstanding operations on the superline, as necessitated by prior technologies. Thus, updates to multiple line states of a superline can be maintained simultaneously, and up-to-date ECCs can be computed.

Several advantages can be achieved through the implementation of the technologies described herein. For example, individual line state updates can be easily performed, thereby enabling the use of SSA cells for line state storage and/or the implementation of low power transistors (saving both area and power). Additionally, since a new request to the same superline will see the latest line state vector in the cache controller (as described in detail herein), multiple requests can go without needing to reject or wait, thus preventing the adverse performance impact from line state updates attendant with prior technologies.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system haven't been described in detail in order to avoid unnecessarily obscuring the present disclosure.

Although the following embodiments may be described with reference to implementing a line state tracker in computing platforms or microprocessors, other embodiments are applicable to other types of integrated circuits and logic devices. Similar techniques and teachings of embodiments described herein may be applied to other types of circuits or semiconductor devices that may also benefit from implementing a line state tracker. For example, the disclosed embodiments are not limited to desktop computer systems or Ultrabooks™, and may be also used in other devices, such as handheld devices, tablets, other thin notebooks, systems on a chip (SOC) devices, and embedded applications. Some examples of handheld devices include cellular phones ('smartphones'), Internet protocol devices, digital cameras, personal digital assistants (PDAs), and handheld personal computers (PCs). Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

Although the following embodiments are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations or embodiments of the present disclosure.

Although the below examples describe instruction handling and distribution in the context of execution units and logic circuits, other embodiments of the present disclosure can be accomplished by way of data or instructions stored on a machine-readable, tangible medium, which when performed by a machine cause the machine to perform functions consistent with at least one embodiment of the invention. In one embodiment, functions associated with embodiments of the present disclosure are embodied in machine-executable instructions. The instructions can be used to cause a general-purpose or special-purpose processor that is programmed with the instructions to perform the operations of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosed technologies can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc-Read-Only Memory (CD-ROM), and magneto-optical disks, Read-Only Memory (ROM), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file). In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., two dimensional (2D)/three dimensional (3D) graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may be a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination register.

Turning to FIG. 1A, a block diagram of an exemplary computer system formed with a processor that includes execution units to execute an instruction, where one or more of the interconnects implement one or more features in accordance with one embodiment of the present disclosure, is illustrated. System 100 includes a component, such as a processor 102 to employ execution units including logic to perform algorithms for process data, in accordance with the present disclosure, such as in the embodiment described herein. System 100 is representative of processing systems based on the PENTIUM III™, PENTIUM 4™, Xeon™, Itanium™, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux™ for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPCs), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator/video card 112, memory controller hub 116, memory 120, I/O controller hub 130, data storage 124, wireless transceiver 126, Flash BIOS 128, Network controller 134, Audio controller 136, Serial expansion port 138, legacy I/O controller 140, etc.) perform their conventional functions that are well known to those familiar with the art.

In one embodiment, the processor 102 includes a Level 1 (L1) internal cache memory 104. Depending on the architecture, the processor 102 may have a single internal cache or multiple levels of internal caches. Processor 102 also includes cache controller 101 coupled to cache 104. Cache controller 101 can control various operations performed by and/or in relation to cache 104. In certain implementations, cache controller 101 can include line state tracker (LST) 101A. LST 101A can include instructions and/or logic to track updates to the line state of a cache superline. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer registers.

Execution unit 108, including logic to perform integer and floating point operations, also resides in the processor 102. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102.

A system logic chip is coupled to the processor bus 110 and memory 120. The system logic chip in the illustrated embodiment is a memory controller hub (MCH 116). The processor 102 can communicate to the MCH 116 via a processor bus 110. The MCH 116 provides a high bandwidth memory path or memory interface 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O interface bus 122. In some embodiments, the system logic chip or MCH 116 can provide a graphics port for coupling to a graphics controller/video card 112. The MCH 116 is coupled to memory 120 through a memory interface 118. The graphics/video card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller 136, firmware hub (flash BIOS) 128, wireless transceiver 126, data storage 124, legacy I/O controller 140 containing user input and keyboard interfaces, a serial expansion port 138 such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises a processor and a memory. The memory for one such system is a flash memory. The flash memory can be located on the same die as the processor and other system components. Additionally, other logic blocks such as a memory controller or graphics controller can also be located on a system on a chip.

Figure 1B:
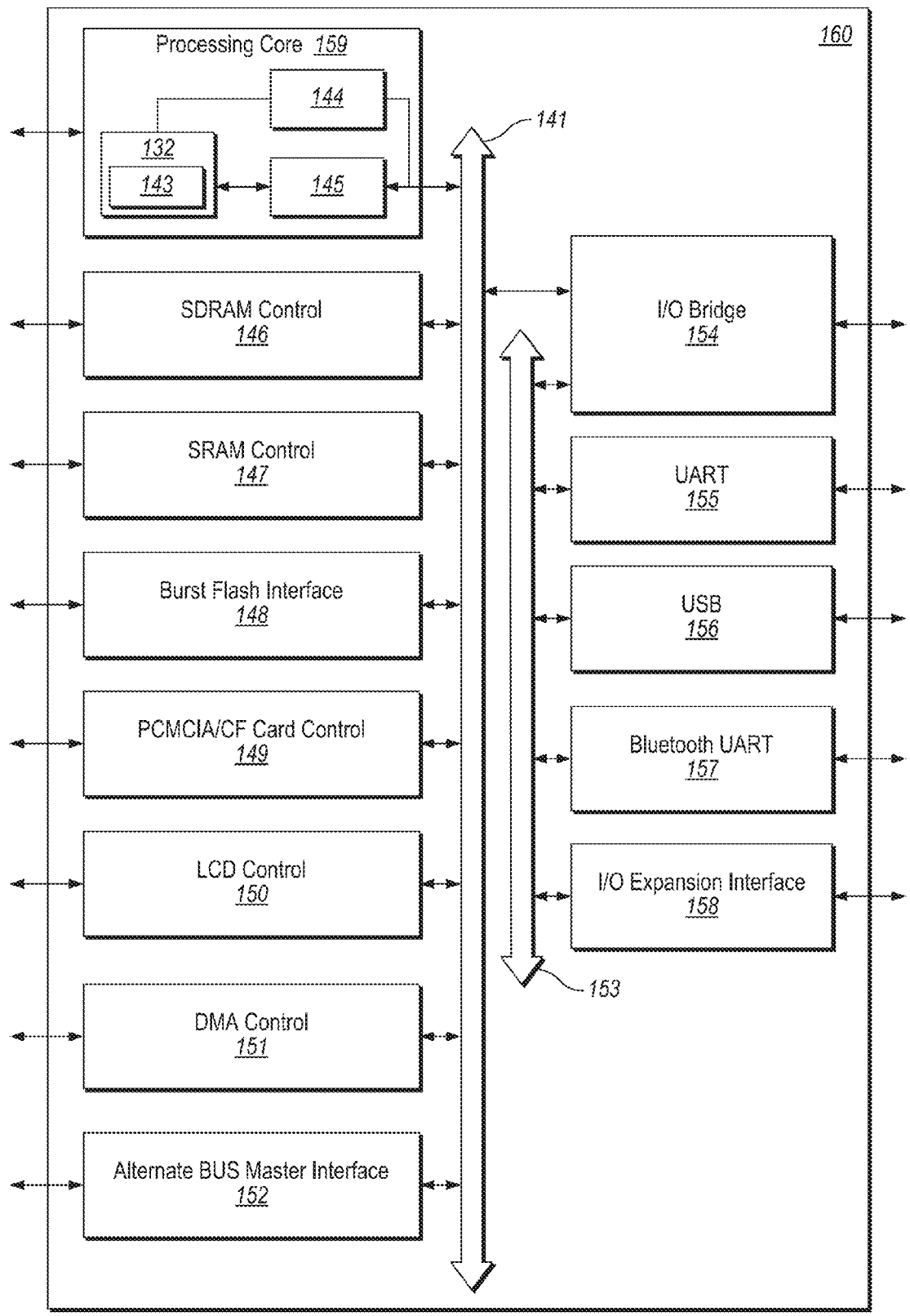
FIG. 1B is a block diagram of one embodiment of a system for implementing a line state tracker.

FIG. 1B illustrates a data processing or computer system 160 which implements the principles of one embodiment of the present disclosure. It will be readily appreciated by one of skill in the art that the embodiments described herein can be used with alternative processing systems without departure from the scope of embodiments of the disclosure.

Computer system 160 comprises a processing core 159 capable of tracking updates to the line state of a cache superline. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 132, a set of register file(s) 145, and a decoder 144. Processing core 159 also includes additional circuitry (not shown) which is not necessary to the understanding of embodiments of the present disclosure. Execution unit 132 is used for executing instructions received by processing core 159. In addition to performing typical processor instructions, execution unit 132 can perform instructions in packed instruction set 143 for performing operations on packed data formats. Packed instruction set 143 includes instructions for performing embodiments of the disclosed technologies and other packed instructions. Execution unit 132 is coupled to register file 145 by an internal bus. Register file 145 represents a storage area on processing core 159 for storing information, including data. As previously mentioned, it is understood that the storage area used for storing the packed data is not critical. Execution unit 132 is coupled to decoder 144. Decoder 144 is used for decoding instructions received by processing core 159 into control signals and/or microcode entry points. In response to these control signals and/or microcode entry points, execution unit 132 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash interface 148, personal computer memory card international association (PCMCIA)/compact flash (CF) card control 149, liquid crystal display (LCD) control 150, direct memory access (DMA) controller 151, and alternate bus master interface 152. In one embodiment, data processing system 160 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 160 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
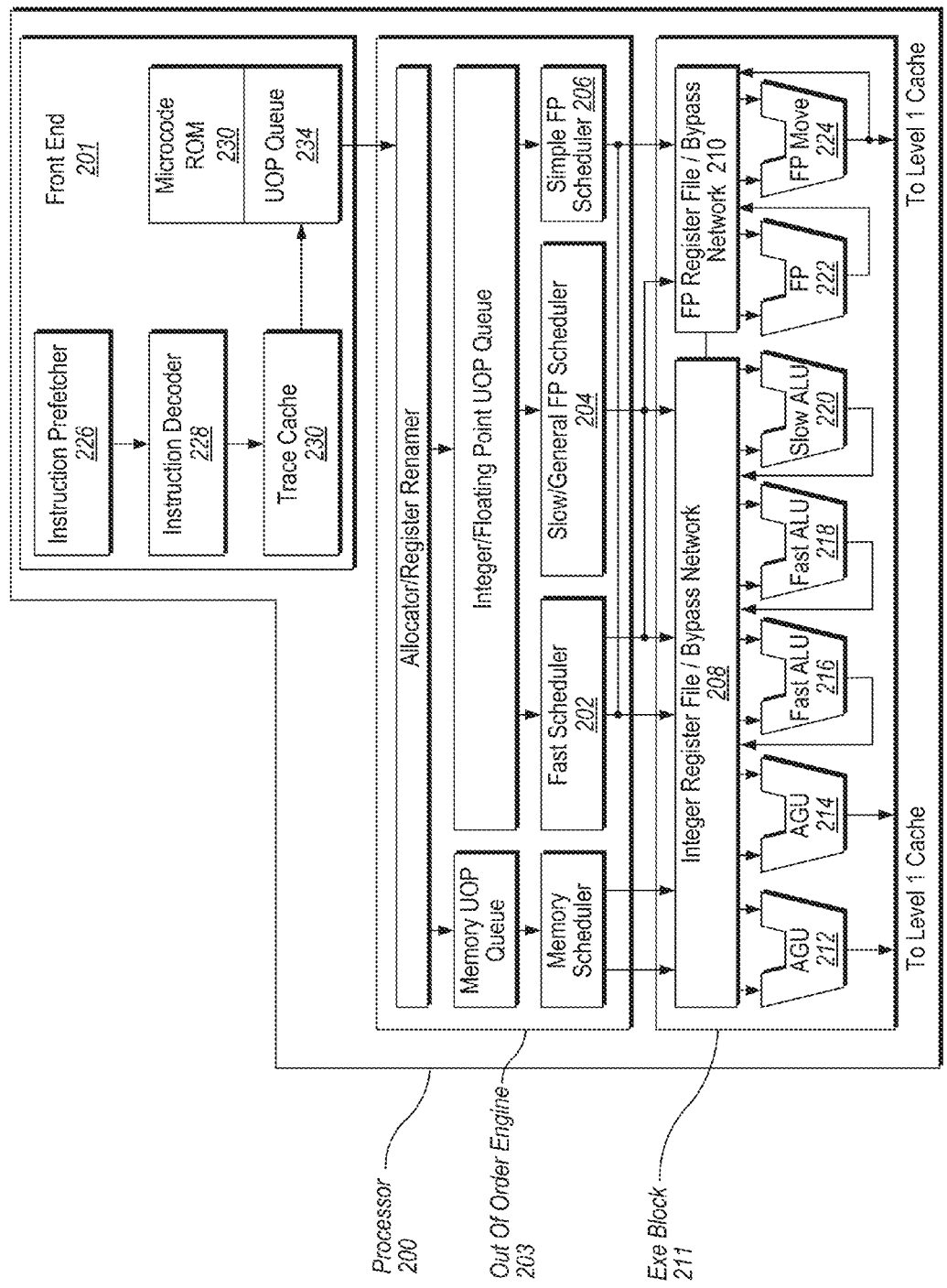
FIG. 1C is a block diagram of a processor according to one embodiment.

FIG. 1C illustrates a block diagram of the micro-architecture for a processor 200 that includes logic circuits to track updates to the line state of a cache superline in accordance with one embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the microcode ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution engine or logic has a number of buffers to smooth out and re-order the flow of instructions to optimize performance as they go down the pipeline and get scheduled for execution. The allocator logic allocates the machine buffers and resources that each uop needs in order to execute. The register renaming logic renames registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present disclosure, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

In one embodiment, processor 200 also includes logic to implement a line state tracker according to embodiments of the disclosed technologies. In other embodiments, processing device 200 may include hardware circuitry to implement a line state tracker according to at least one embodiment.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generally as "SSEx") technology can also be used to hold such packed data operands. In one embodiment, in storing packed data and integer data, the registers do not need to differentiate between the two data types. In one embodiment, integer and floating point data are either contained in the same register file or different register files. Furthermore, in one embodiment, floating point and integer data may be stored in different registers or the same registers.

FIG. 1D is a block diagram illustrating an in-order pipeline and a register renaming stage, out-of-order issue/execution pipeline according to at least one embodiment of the disclosed technologies. FIG. 1E is a block diagram illustrating an in-order architecture core and a register renaming logic, out-of-order issue/execution logic to be included in a processor according to at least one embodiment of the disclosed technologies. The solid lined boxes in FIG. 1D illustrate the in-order pipeline, while the dashed lined boxes illustrates the register renaming, out-of-order issue/execution pipeline. Similarly, the solid lined boxes in FIG. 1E illustrate the in-order architecture logic, while the dashed lined boxes illustrates the register renaming logic and out-of-order issue/execution logic.

In FIG. 1D, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 1E, arrows denote a coupling between two or more units and the direction of the arrow indicates a direction of data flow between those units. FIG. 1E shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register map and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory. In certain implementations, one or more of the referenced caches/cache units (e.g., 474, 476) can include and/or be coupled to a cache controller and/or an LST (such as those depicted in FIG. 1A), such as in order to track updates to the line state of a cache superline, as described herein.

By way of example, the exemplary register renaming, out-of-order issue/execution core architecture may implement the pipeline 400 as follows: 1) the instruction fetch unit 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster(s) 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
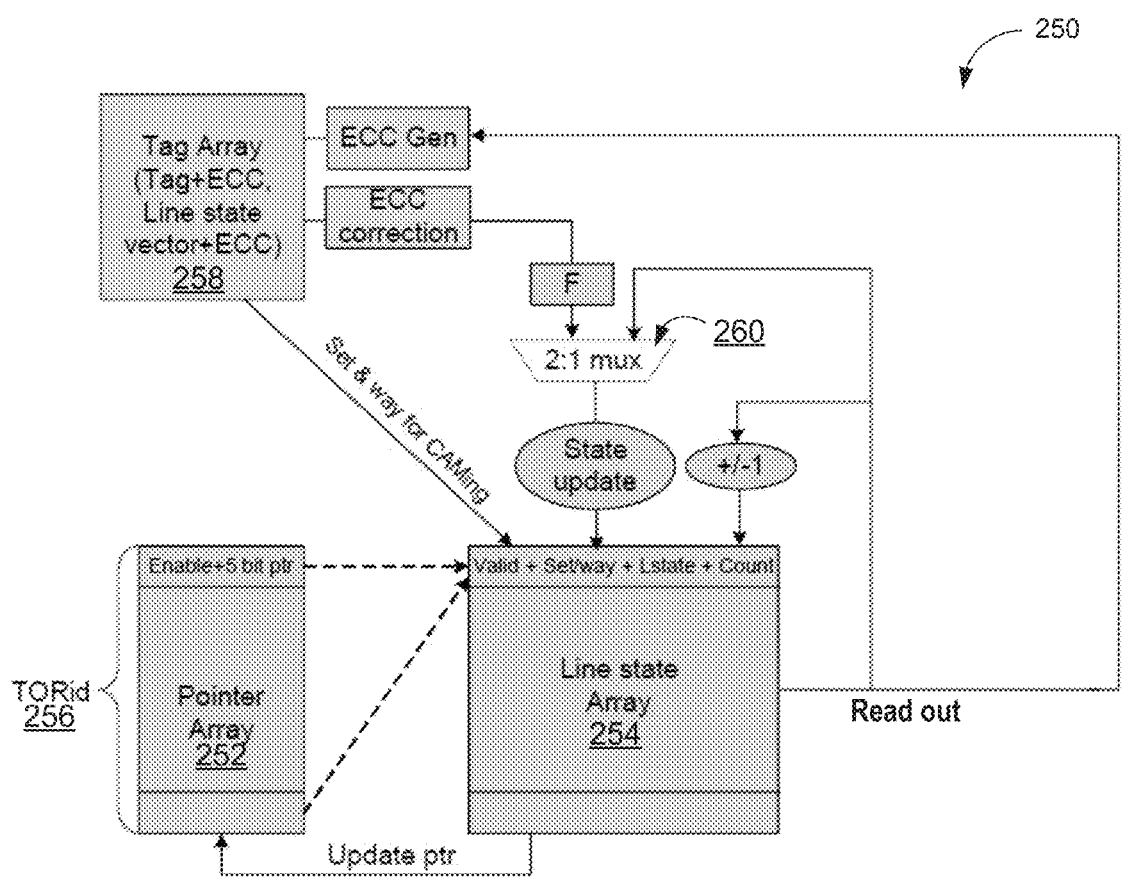
FIG. 2 is a block diagram of one embodiment of a line state tracker.

Turning to FIG. 2, a block diagram of an exemplary cache controller/line state tracker (LST) that implements one or more features in accordance with one embodiment of the present disclosure is illustrated. The illustrated technologies pertain to the implementation of a cache controller (having, in certain implementations, an LST) to perform RMW and track pending line state updates outside of tag array to allow multiple line state updates in parallel, thereby minimizing any performance impact from sector design. A relatively small array can keep track of operations to a line state of the superline. In the event of a line state update, the update can occur immediately in the cache controller/LST (previously the update needed to wait for all outstanding operations on the superline to complete).

In certain embodiments the cache controller/LST 250 can comprise two arrays (as shown in FIG. 2), a Pointer Array 252 and a Line State Array 254. The Pointer Array can be an extension of TOR (Table Of Content) and indexed by TORid 256. In certain implementations, Pointer Array 252 can contain pointers to the Line State Array 254. The Line State Array can have the some number of entries as TOR and can also contain Set/Way and line state vector of a superline. The Line State Array can also contain a 4-bit counter which can be used to track how many state update requests are pending with respect to a particular superline.

Pointer Array 252 can include an 'Enable' element or value which can be a Pointer valid bit that can indicate that a request in this TOR entry is going to update the line state. The Pointer Array can also include a 'Ptr' element or value which can be a pointer (such as a 5-bit pointer) that can index the Line State Array for line state.

Line State Array 254 can include a 'Valid' element or value which can be an Entry valid bit. The LST can also include 'Set/Way' elements or values which can be used by the superline. The LST can also include a 'Lstate' element or value which can be a line state vector (such as a 32-bit line state vector consisting of 16 line states (MESI) in the superline). The cache controller/LST can also include a 'Count' element or value which can be a counter (such as 4-bit counter) that can be used to track pending updates in the superline. Table 1 (below) depicts various exemplary values for certain of the elements of the cache controller/LST

TABLE 1

| Valid | Count | Comment |
|-------|-------|---------|
| 0 | x | Entry is not used |
| 1 | 0 | 1 pending update |
| 1 | 1 | 2 pending updates |
| ... | ... | ... |
| 1 | 15 | 16 pending updates |

In certain implementations, the cache controller/LST can operate within a context such that a given request that updates the line state will go through two pipeline passes: a cache lookup pass and a line state write pass. In doing so, a determination can be made during the read phase as to what state the line is going to be in, and the line state tracker can be written to with information from the read phase. An array write can be performed subsequently, thereby avoiding having to do multiple simultaneous state updates by line state tracker.

Tag array 258 enables the generating of correct ECC over all cache line states. Accordingly, it can be appreciated that the cache controller/LST enables the simultaneous maintaining of updates to multiple line states (e.g., 16 line states), and also keeping the ECC up to date.

During the lookup pass, the initial line state vector can be brought into the cache controller/LST from a tag array read by the first request to a superline. Successive requests to the same superline can perform RMW operation in the cache controller/LST to update line state and increment the Count value. Accordingly, the cache controller/LST can maintain the latest line state vector for superlines that exist in the cache controller/LST. The line state vector lives in a cache controller/LST entry until all requests (as tracked by the Count value) to the superline complete the line state write pass, which writes the line state vector from cache controller/LST back to the tag array.

Using the cache controller/LST, various advantages are realized with respect to line state update from sectored cache with a combined line state. For example, individual line state update with RMW operation can be easily done in the LST. There are no special requirements on SSA cells for line state storage. Accordingly, low power transistors can be implemented for the cells to save area and power. Moreover, with Pointer Array, multiple requests (such as up to 16 requests, based on the number of lines in the superline) can share one cache controller/LST entry. Additionally, since a new request to the same superline will see the latest Line state vector in the cache controller/LST, multiple requests can go without needing to reject or wait, thus preventing performance impact from line state updates.

In operation, the cache controller/LST can be implemented as follows: A request can perform a cache lookup for line state update. Line state vector gets read out from the tag array. Set address and hit way (from cache lookup) can be used to Cam Set/Way field in the Line State Array. If Cam hits, a RMW operation can be performed to update line state in the cache controller/LST by: reading out Lstate and Count values from the entry with Cam hit, controlling 2:1 mux 260 to select Lstate and Count values from Line State Array readout, updating the line state in Lstate and incrementing Count, writing Lstate and Count back to the Line State Array, and writing an encoded hit vector into Ptr field in Pointer Array indexed by TORid and setting the Enable bit. If Cam misses, then the line state vector can be brought from tag array to the cache controller/LST, the 2:1 mux can be controlled to select line state vector from tag array readout, the line state can be updated, Count can be set to 0, an empty entry (Valid=0) can be found and Set/Way, Lstate and Count can be written into the Line State Array, entry Valid bit can be set, and an encoded entry index can be written into Ptr field in Pointer Array and Enable bit can be set.

It should be noted that in line state write pass, TORid can be used to read out the pointer from Pointer Array. If Enable is set, the pointer can be used to read out Lstate and Count from the Line State Array. An ECC can be generated and the Lstate and its ECC can be sent to tag array for write. The Enable bit in Pointer array can also be cleared. Moreover, if Count is 0, entry Valid bit can be cleared. Otherwise, Count can be decremented and written back into the Line State Array.

Figure 3:
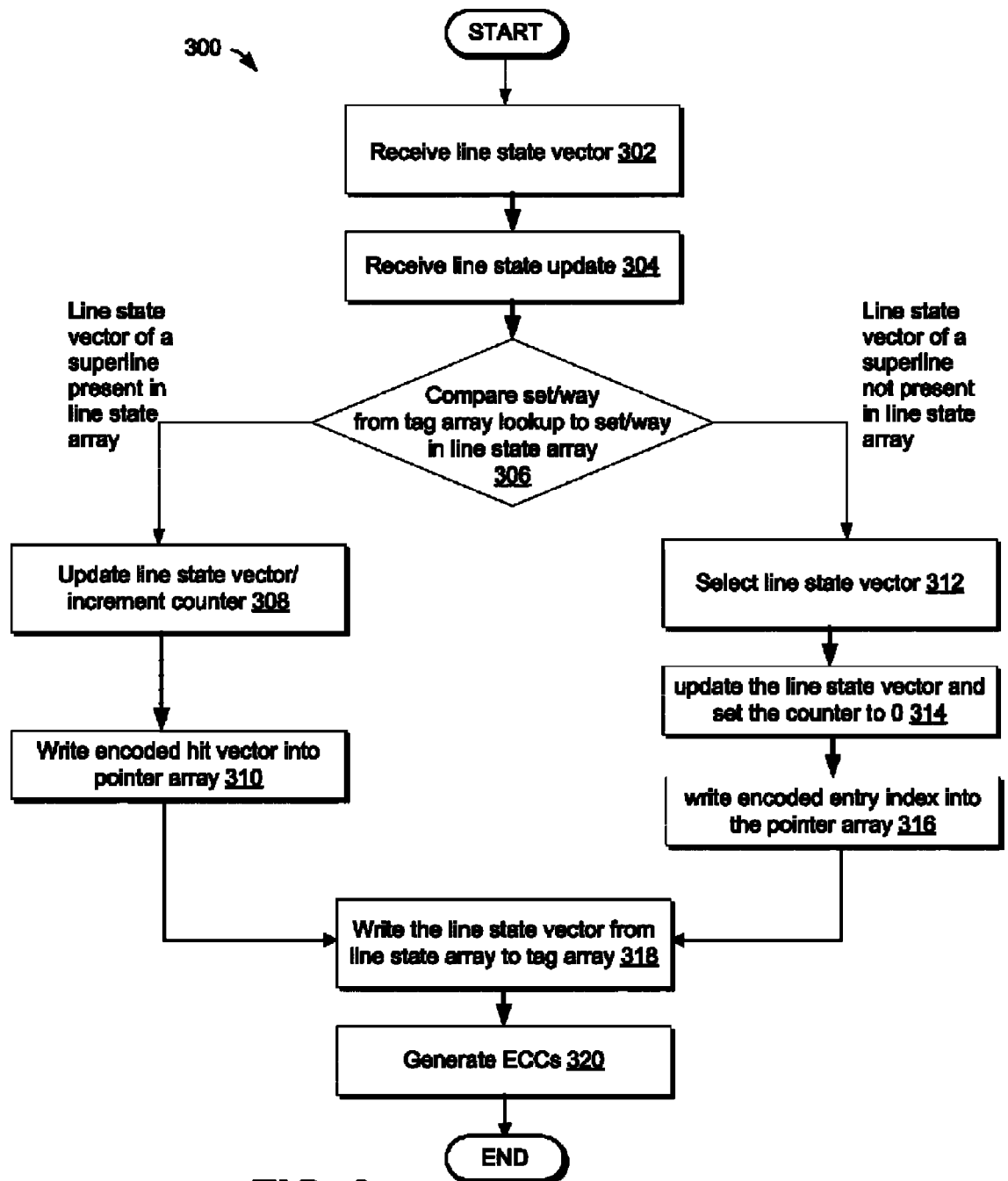
FIG. 3 is a flow diagram illustrating a method for implementing a line state tracker according to an embodiment.

FIG. 3 is a flow diagram of method 300 for tracking updates to the line state of a cache superline according to some embodiments. Method 300 may be performed by processing logic that may comprise hardware (e.g., circuitry, dedicated logic, programmable logic, microcode, etc.), software (such as instructions run on a processing device), firmware or a combination thereof.

Referring to FIG. 3, the method 300 begins by the cache controller/line state tracker receiving a line state vector from tag array lookup (block 302). In certain implementations, the line state vector of the superline comprises a 32-bit line state vector. The cache controller/line state tracker receives a line state update from the request (block 304). Set address and way from tag array lookup are used to compare Set and Way fields in the line state array (block 306). In certain implementations, the line state array further comprises at least one of: (a) an entry valid bit, (b) a set value, and (c) a way value. Based on a determination that the line state vector of a superline is present in the line state array, the cache controller/line state tracker can perform RMW operation to update the line state vector and increment the counter (block 308), and write an encoded hit vector into the pointer array (block 310). In certain implementations, the pointer array further comprises a pointer valid bit that is configured to indicate that a request is going to update the line state. Moreover, in certain implementations, the counter is configured to track a quantity of pending state update requests to the superline. Based on a determination (in block 306) that the line state vector of a superline is not present in the line state array, the cache controller/line state tracker can control a 2:1 mux to select a line state vector from a tag array readout (block 312), perform RMW operation to update the line state vector, and set the counter to 0 (block 314), and write an encoded entry index into the pointer array (block 316). Whenever an operation that updates the cache controller/LST completes, it writes the line state vector from the cache controller/LST to the tag array (block 318), and generates Error Code Correction (ECC) (block 320). Based on a determination that all requests to the superline have completed, the entry in the cache controller/LST can be deallocated. In certain implementations, the determination that all requests to the superline have completed is determined based on a value of the counter. Moreover, in certain implementations, the determination that all requests to the superline have completed comprises a determination that a line state write pass has completed.

Figure 4:
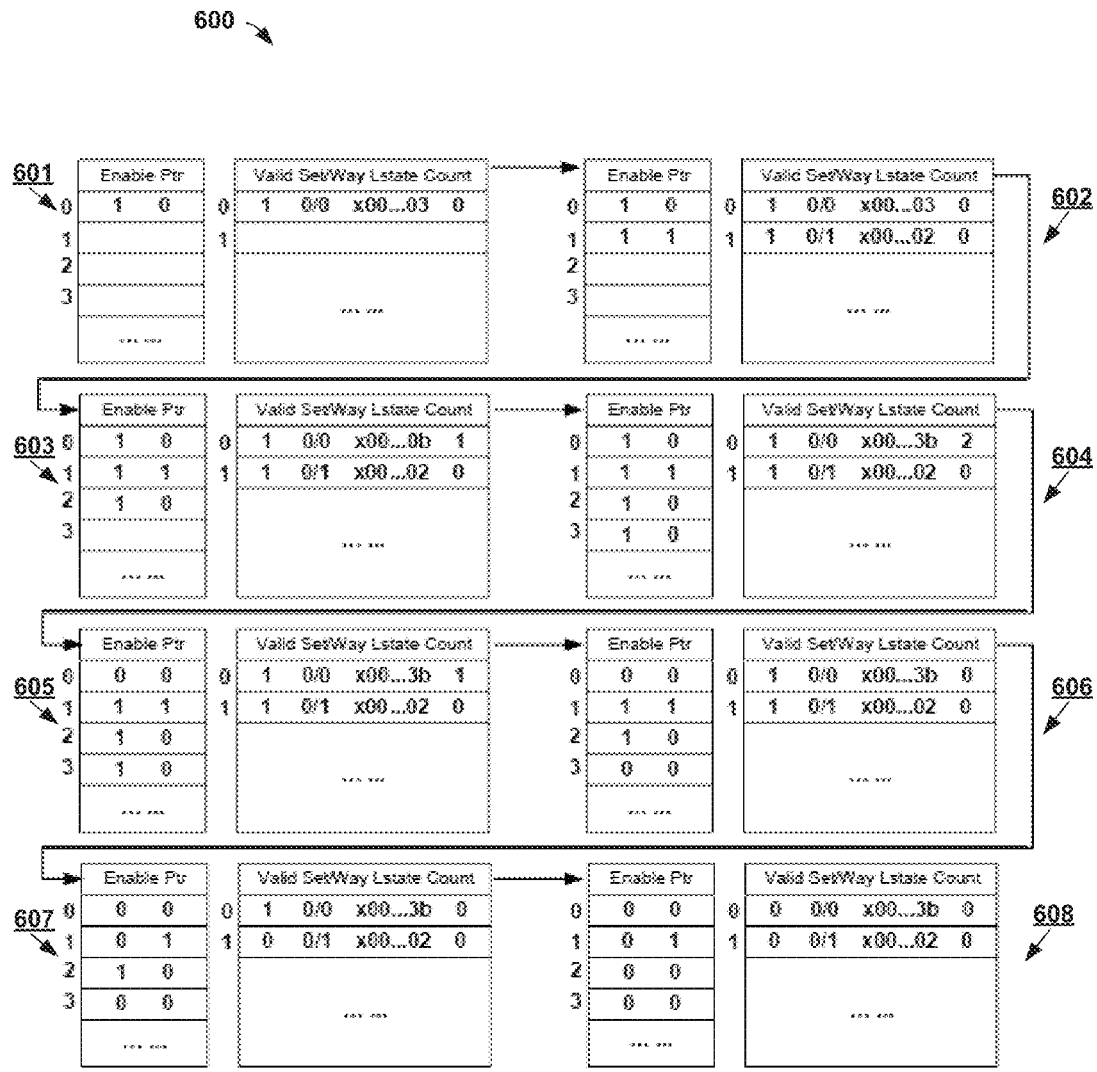
FIG. 4 is a diagram illustrating an exemplary request sequence according to an embodiment.

FIG. 4 is a diagram illustrating an exemplary request sequence 600 according to some embodiments. The various operations associated with request sequence 600 may be performed by processing logic that may comprise hardware (e.g., circuitry, dedicated logic, programmable logic, microcode, etc.), software (such as instructions run on a processing device), firmware or a combination thereof. For example, the referenced operations can be performed by cache controller 101/LST 101A (as shown in FIG. 1A) in order to track updates to the line state of a cache superline.

Referring to FIG. 4, the respective cache controller/LST line state updates are shown with respect to each operation in the sequence 600. At 601, Request1 (TORid=0) is received to write new state M (using 2-bit MESI state encoding where M=11, E=10, S=01, I=00) to set=0, way=0, line index=0. The request allocates entry 0. At 602, Request2 (TORid=1) is received to write new state E to set=0, way=1, line index=0. The request allocates entry 1. At 603, Request3 (TORid=2) is received to write new state E to set=0, way=0, line index=1. The request hits and updates entry 0. At 604 Request4 (TORid=3) is received to write new state M to set=0, way=0, line index=2. The request hits and updates entry 0. At 605, Request1 writes back line state to tag array from entry 0. At 606, Request4 writes back line state to tag array from entry 0. At 607, Request2 writes back line state to tag array from entry 1 and deallocates it. At 608, Request3 writes back line state to tag array from entry 0 and deallocates it.

Figure 5:
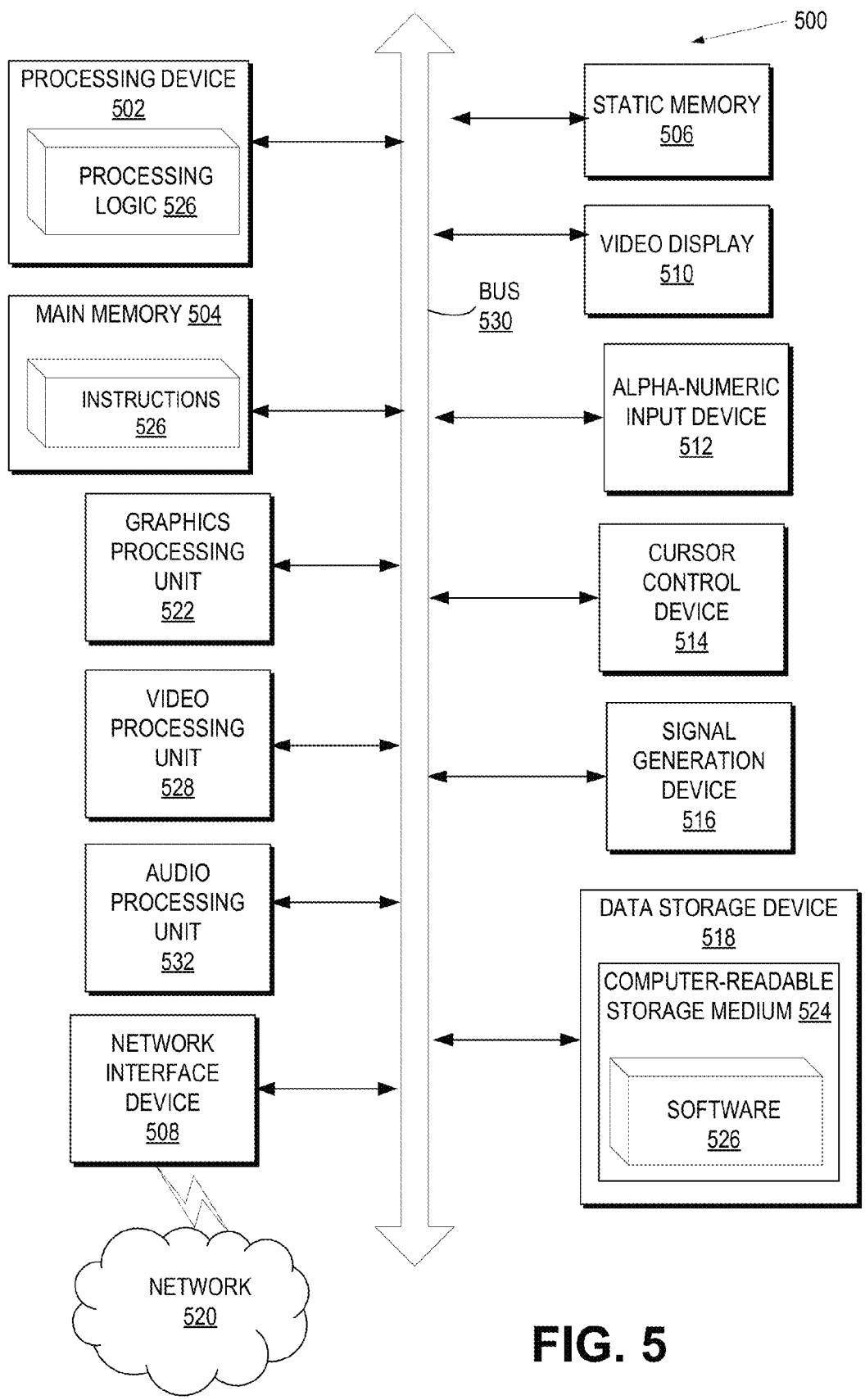
FIG. 5 illustrates a diagrammatic representation of a machine in the example form of a computer system within which a set of instructions, for causing the machine to perform any one or more of the methodologies discussed herein, may be executed.

FIG. 5 illustrates a representation of a machine in the example form of a computer system 500 within which a set of instructions may be executed, for causing the machine to perform any one or more of the methodologies discussed herein, such as tracking updates to the line state of a cache superline. In alternative embodiments, the machine may be connected (e.g., networked) to other machines in a local area network (LAN), an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or RAMBUS DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In one embodiment, processing device 502 may include one or more processing cores. The processing device 502 is configured to execute the processing logic 526 for performing the operations discussed herein. In one embodiment, processing device 502 is the same as computing system 100 of FIG. 1A. In another embodiment, processing device 502 is the same as computing system 160 of FIG. 1B. In another embodiment, processing device 502 implements a line state tracker module (not shown).

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a signal generation device 516 (e.g., a speaker), or other peripheral devices. Furthermore, computer system 500 may include a graphics processing unit 522, a video processing unit 528, and an audio processing unit 532. In another embodiment, the computer system 500 may include a chipset (not illustrated), which refers to a group of integrated circuits, or chips, that are designed to work with the processing device 502 and controls communications between the processing device 502 and external devices. For example, the chipset may be a set of chips on a motherboard that links the processing device 502 to very high-speed devices, such as main memory 504 and graphic controllers, as well as linking the processing device 502 to lower-speed peripheral buses of peripherals, such as universal serial bus (USB), peripheral component interconnect (PCI) or industry standard architecture (ISA) buses.

The data storage device 518 may include a computer-readable storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500, the main memory 504 and the processing device 502 also constituting computer-readable storage media. The reference numeral 526 may thus be referred to herein as software, instructions, or processing logic 526.

The computer-readable storage medium 524 may also be used to store instructions 526 for tracking updates to the line state of a cache s superline, such as is described with respect to FIGS. 1A-1E, FIG. 2, and/or a software library containing methods that call the above applications. While the computer-readable storage medium 524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present embodiments. The term "computer-readable storage medium" shall accordingly be taken to include, but not be limited to, solid-state memories, and optical and magnetic media.

Figure 6:
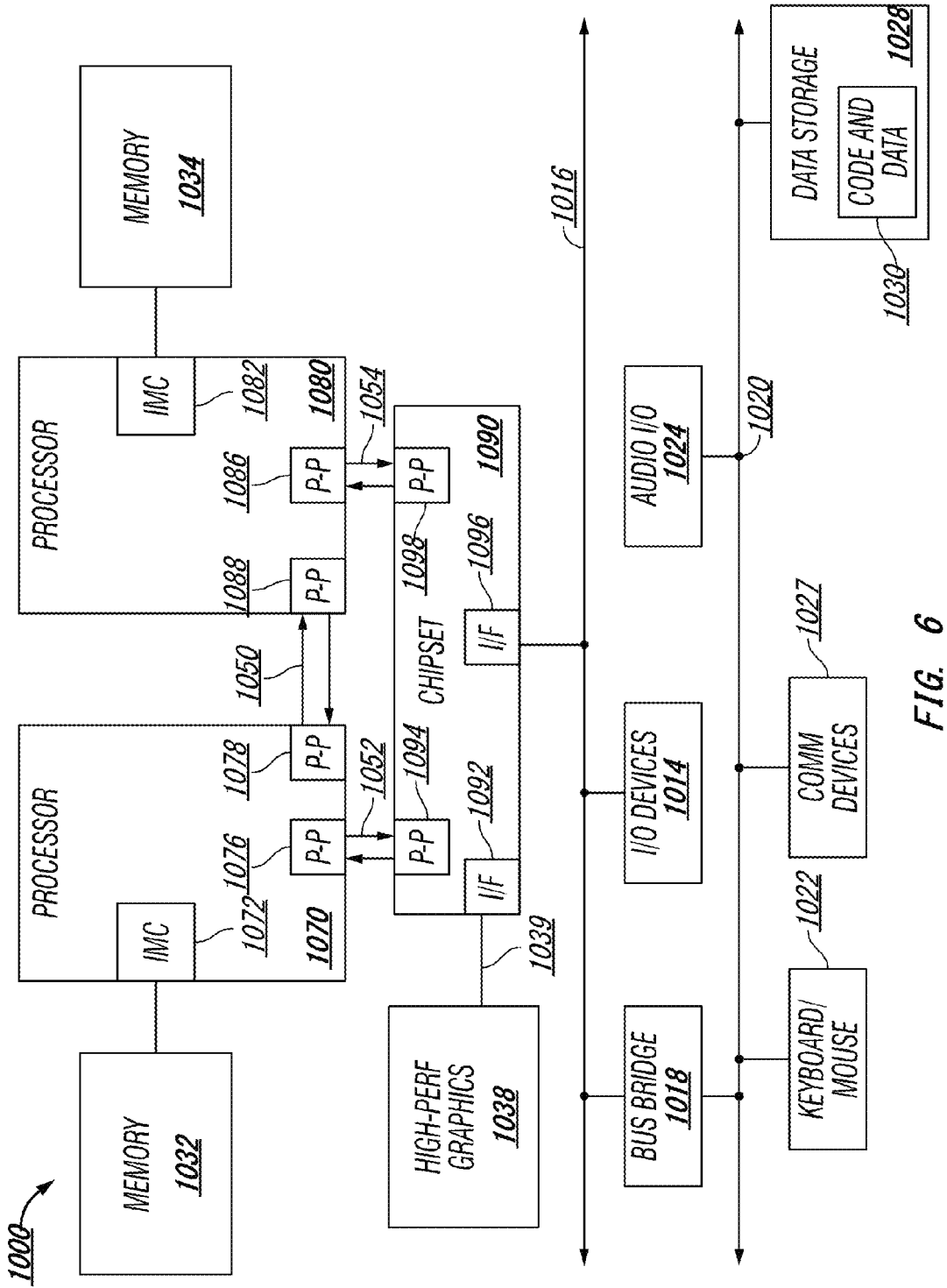
FIG. 6 is a block diagram of a computer system according to one embodiment.

Referring now to FIG. 6, shown is a block diagram of a second system 1000 in accordance with an embodiment of the present disclosure. As shown in FIG. 6, multiprocessor system 1000 is a point-to-point interconnect system, and includes a first processor 1070 and a second processor 1080 coupled via a point-to-point interconnect 1050. Each of processors 1070 and 1080 may be some version of the computing systems described herein, such as systems for tracking updates to the line state of a cache superline.

While shown with two processors 1070, 1080, it is to be understood that the scope of the present disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface or interconnect 1050 using P-P interface circuits 1078, 1088. As shown in FIG. 6, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces or interconnects 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not no limited.

As shown in FIG. 6, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a data storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 6, a system may implement a multi-drop bus or other such architecture.

Figure 7:
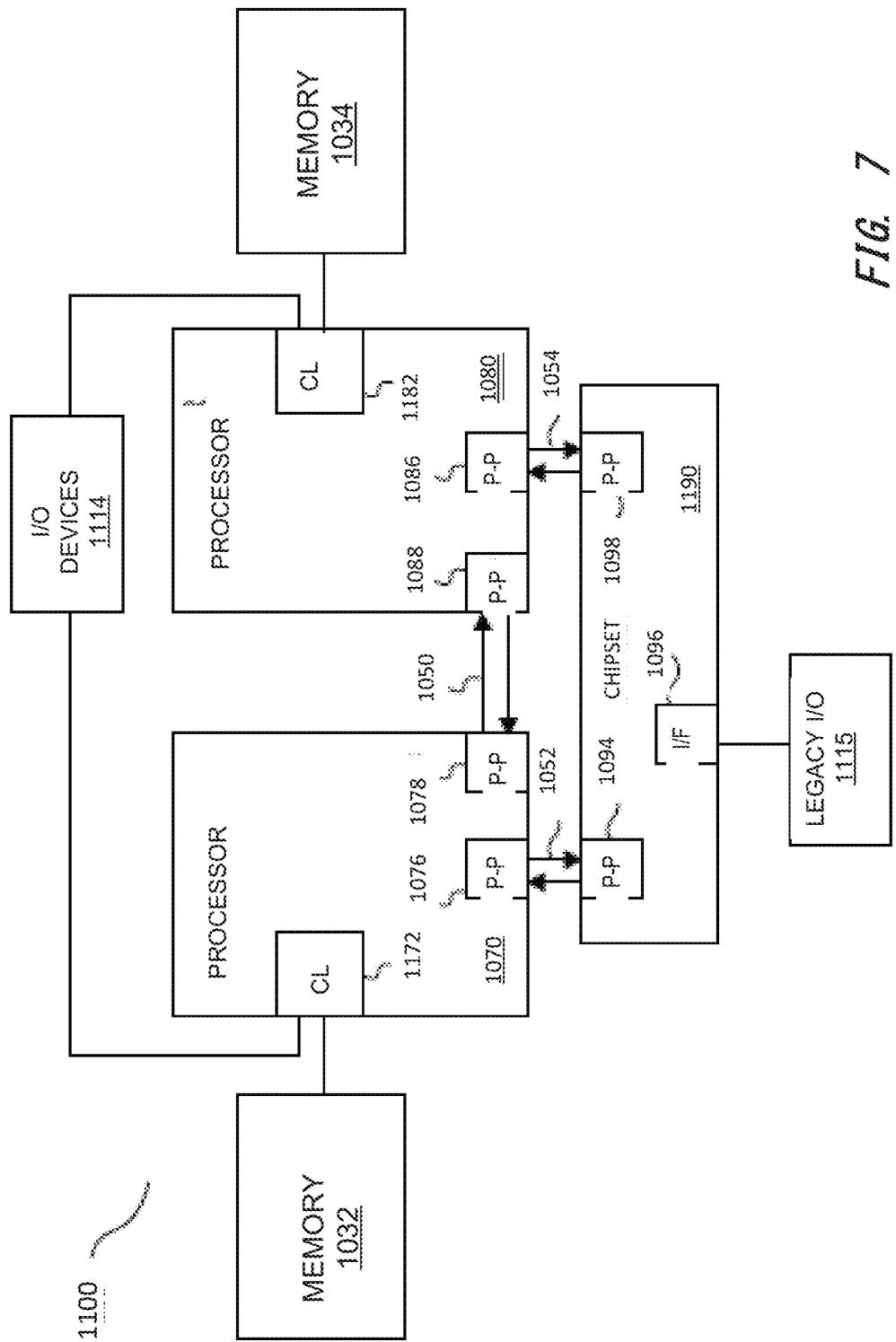
FIG. 7 is a block diagram of a computer system according to one embodiment.

Referring now to FIG. 7, shown is a block diagram of a third system 1100 in accordance with an embodiment of the present disclosure, such as a system for tracking updates to the line state of a cache superline. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processors 1070, 1080 may include integrated memory and I/O control logic ("CL") 1172 and 1182, respectively. For at least one embodiment, the CL 1172, 1182 may include integrated memory controller units such as that described above in connection with FIG. 6. In addition. CL 1172, 1182 may also include I/O control logic. FIG. 7 illustrates that the memories 1032, 1034 are coupled to the CL 1172, 1182, and that I/O devices 1114 are also coupled to the control logic 1172, 1182. Legacy I/O devices 1115 are coupled to the chipset 1190.

The following examples pertain to further embodiments.

Example 1 is a processing device comprising: a cache having a plurality of superlines; and a cache controller, coupled to the cache, the cache controller comprising: 1) a line state array comprising (a) a counter to track a quantity of pending state update requests to a superline, and (b) a line state vector of the superline; and 2) a pointer array comprising a pointer to the line state array, wherein the cache controller is configured to: perform, in response to a request pertaining to the superline, one or more read-modify-write (RMW) operations to (a) the line state vector and (b) the counter; and based on a determination that one or more requests to the superline have completed, write the line state vector from the line state array to a tag array.

In Example 2, the cache controller of Example 1 is optionally further configured to: based on a determination that the line state vector is present in the line state array, receive a line state update, compare a set address and a hit way with set and way fields in the line state array; and perform the one or more RMW operations to update the line state vector and increment the counter.

In Example 3, the cache controller of Example 2 is optionally further configured to: write an encoded hit vector into the pointer array.

In Example 4, the cache controller of Example 1 is optionally further configured to: based on a determination that the line state vector is not present in the line state array, control a 2:1 mux to select a line state vector from tag array readout; perform the one or more RMW operations to update the line state vector and set the counter to 0; and write an encoded entry index into the pointer array.

In Example 5, the processing device of Example 1, wherein the determination that one or more requests to the superline have completed is determined based on a value of the counter.

In Example 6, the processing device of Example 1, wherein the determination that one or more requests to the superline have completed comprises a determination that a line state write pass has completed.

In Example 7, the processing device of Example 1, wherein a line state write pass writes the line state vector to the tag array.

In Example 8, the processing device of Example 1, wherein the counter is configured to track a quantity of pending state update requests to the superline.

In Example 9, the processing device of Example 1, wherein the line state vector of the superline comprises a 32-bit line state vector.

In Example 10, the processing device of Example 1, wherein the pointer array further comprises a pointer valid bit that is configured to indicate that a request is going to update the line state.

In Example 11, the processing device of Example 1, wherein the pointer to the line state array comprises a five bit pointer.

In Example 12, the processing device of Example 1, wherein the cache controller is further configured to generate one or more error correction codes (ECCs) for the tag array.

In Example 13, The processing device of Example 1, wherein the line state array further comprises at least one of: (a) an entry valid bit, (b) a set value, and (c) a way value.

Various embodiments may have different combinations of the operational features described above. For instance, all optional features of the apparatus described above may also be implemented with respect to the method or process described herein and specifics in the examples may be used anywhere in one or more embodiments.

Example 14 is a method comprising: performing, with a processing device and in response to a request pertaining to a superline, one or more read-modify-write (RMW) operations to (a) a line state vector of a line state array and (b) a counter of the line state array; and writing, based on a determination that one or more requests to the superline have completed, the line state vector from the line state array to a tag array.

In Example 15, The method of Example 14, wherein, based on a determination that the line state vector is present in the line state array, the method further comprises: receiving a line state update; comparing a set address and a hit way with set and way fields in the line state array; and performing the one or more RMW operations to update the line state vector and increment the counter.

In Example 16, the method of Example 15, further comprising writing an encoded hit vector into the pointer array.

In Example 17, the method of Example 14, wherein, based on a determination that the line state vector is not present in the line state array, the method further comprises: controlling a 2:1 mux to select a line state vector from tag array readout; performing the one or more RMW operations to update the line state vector and set the counter to 0; and writing an encoded entry index into the pointer array.

In Example 18, the method of Example 14, wherein the determination that one or more requests to the superline have completed is determined based on a value of the counter.

In Example 19, the method of Example 14, wherein the determination that one or more requests to the superline have completed comprises a determination that a line state write pass has completed.

In Example 20, the method of Example 14, wherein a line state write pass writes the line state vector to the tag array.

In Example 21, the method of Example 14, wherein the counter is configured to track a quantity of pending state update requests to the superline.

In Example 22, the method of Example 14, wherein the line state vector of the superline comprises a 32-bit line state vector.

In Example 23, the method of Example 14, wherein the pointer array further comprises a pointer valid bit that is configured to indicate that a request is going to update the line state.

In Example 24, the method of Example 14, wherein the pointer to the line state array comprises a five bit pointer.

In Example 25, the method of Example 14, further comprising generating one or more error correction codes (ECCs) for the tag array.

In Example 26, the method of Example 14, wherein the line state array further comprises at least one of: (a) an entry valid bit, (b) a set value, and (c) a way value.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 27 is a non-transitory, computer-readable storage medium including instructions that, when executed by a computing system, cause the computing system to perform the method of Examples 14-26.

Example 28 is a system comprising: a processor, the processor comprising: a cache having a plurality of superlines; and a cache controller, coupled to the cache, the cache controller comprising: 1) a line state array comprising (a) a counter to track a quantity of pending state update requests to a superline, and (b) a line state vector of the superline; and 2) a pointer array comprising a pointer to the line state array, wherein the cache controller is configured to: perform, in response to a request pertaining to the superline, one or more read-modify-write (RMW) operations to (a) the line state vector and (b) the counter; and based on a determination that one or more requests to the superline have completed, write the line state vector from the line state array to a tag array.

In Example 29, the cache controller of the system of Example 28 is optionally further configured to: based on a determination that the line state vector is present in the line state array, receive a line state update, compare a set address and a hit way with set and way fields in the line state array; and perform the one or more RMW operations to update the line state vector and increment the counter.

In Example 30, the cache controller of the system of Example 29 is optionally further configured to: write an encoded hit vector into the pointer array.

In Example 31, the cache controller of the system of Example 28 is optionally further configured to: based on a determination that the line state vector is not present in the line state array, control a 2:1 mux to select a line state vector from tag array readout; perform the one or more RMW operations to update the line state vector and set the counter to 0; and write an encoded entry index into the pointer array.

In Example 32, the processor of the system of Example 28, wherein the determination that one or more requests to the superline have completed is determined based on a value of the counter.

In Example 33, the processor of the system of Example 28, wherein the determination that one or more requests to the superline have completed comprises a determination that a line state write pass has completed.

In Example 34, the processor of the system of Example 28, wherein a line state write pass writes the line state vector to the tag array.

In Example 35, the processor of the system of Example 28, wherein the counter is configured to track a quantity of pending state update requests to the superline.

In Example 36, the processor of the system of Example 28, wherein the line state vector of the superline comprises a 32-bit line state vector.

In Example 37, the processor of the system of Example 28, wherein the pointer array further comprises a pointer valid bit that is configured to indicate that a request is going to update the line state.

In Example 38, the processor of the system of Example 28, wherein the pointer to the line state array comprises a five bit pointer.

In Example 39, the processor of the system of Example 28, wherein the cache controller is further configured to generate one or more error correction codes (ECCs) for the tag array.

In Example 40, the processor of the system of Example 28, wherein the line state array further comprises at least one of: (a) an entry valid bit, (b) a set value, and (c) a way value.

Example 41 is an apparatus comprising: means for performing, in response to a request pertaining to a superline, one or more read-modify-write (RMW) operations to (a) a line state vector of a line state array and (b) a counter of the line state array; and means for writing, based on a determination that one or more requests to the superline have completed, the line state vector from the line state array to a tag array.

In Example 42, the apparatus of Example 41, wherein, based on a determination that a line state update is present in the line state array, the apparatus further comprises: means for receiving a line state update; means for comparing a set address and a hit way with set and way fields in the line state array; and means for performing the one or more RMW operations to update the line state vector and increment the counter.

In Example 43, the apparatus of Example 42, further comprising means for writing an encoded hit vector into the pointer array.

In Example 44, the apparatus of Example 41, wherein, based on a determination that the line state vector is not present in the line state array, the apparatus further comprises: means for controlling a 2:1 mux to select a line state vector from tag array readout; means for performing the one or more RMW operations to update the line state vector and set the counter to 0; and means for writing an encoded entry index into the pointer array.

In Example 45, the apparatus of Example 41, wherein the determination that one or more requests to the superline have completed is determined based on a value of the counter.

In Example 46, the apparatus of Example 41, wherein the determination that one or more requests to the superline have completed comprises a determination that a line state write pass has completed.

In Example 47, the apparatus of Example 41, wherein a line state write pass writes the line state vector to the tag array.

In Example 48, the apparatus of Example 41, wherein the counter is configured to track a quantity of pending state update requests to the superline.

In Example 49, the apparatus of Example 41, wherein the line state vector of the superline comprises a 32-bit line state vector.

In Example 50, the apparatus of Example 41, wherein the pointer array further comprises a pointer valid bit that is configured to indicate that a request is going to update the line state.

In Example 51, the apparatus of Example 41, wherein the pointer to the line state array comprises a five bit pointer.

In Example 52, the apparatus of Example 41, further comprising means for generating one or more error correction codes (ECCs) for the tag array.

In Example 53, the apparatus of Example 41, wherein the line state array further comprises at least one of: (a) an entry valid bit, (b) a set value, and (c) a way value.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring," "initiating," "requesting," "generating," "accessing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processing device for cache control comprising:
   a cache having a plurality of superlines; and
   a cache controller, coupled to the cache, the cache controller comprising:
      a line state array having (a) a counter to track a quantity of pending state update requests to a superline of the plurality of superlines, and (b) a line state vector of the superline of the plurality of superlines; and
      a pointer array comprising a pointer to the line state array;
   wherein the cache controller is to:
      perform, in response to a request pertaining to the superline of the plurality of superlines, one or more read-modify-write (RMW) operations to (a) the line state vector and (b) the counter; and
      based on a determination that one or more requests to the superline of the plurality of superlines have completed, write the line state vector from the line state array to a tag array of the processing device.

2. The processing device of claim 1, wherein the cache controller is further to: based on a determination that the line state vector is present in the line state array,
   receive a line state update;
   compare a set address and a hit way with one or more set and way fields in the line state array; and
   perform the one or more RMW operations to update the line state vector and increment the counter.

3. The processing device of claim 2, wherein the cache controller is further to:
   write an encoded hit vector into the pointer array.

4. The processing device of claim 1, wherein the cache controller is further to: based on a determination the line state vector is not present in the line state array,
   control a 2:1 mux of the processing device to select a line state vector from tag array readout;
   perform the one or more RMW operations to update the line state vector and set the counter to 0; and
   write an encoded entry index into the pointer array.

5. The processing device of claim 1, wherein the determination that one or more requests to the superline have completed is determined based on a value of the counter.

6. The processing device of claim 1, wherein the determination that one or more requests to the superline have completed comprises a determination that a line state write pass has completed.

7. The processing device of claim 1, wherein a line state write pass writes the line state vector to the tag array.

8. The processing device of claim 1, wherein the pointer array further comprises a pointer valid bit that is to indicate that a request is going to update the line state.

9. The processing device of claim 1, wherein the cache controller is further to generate one or more error correction codes (ECCs) for the tag array.

10. A method for cache control comprising:
    performing, by a processing device and in response to a request pertaining to a superline of a plurality of superlines of a cache, one or more read-modify-write (RMW) operations to (a) a line state vector of a line state array and (b) a counter of the line state array which tracks a quantity of pending state update requests to the superline; and
    writing, based on a determination that one or more requests to the superline have completed, the line state vector from the line state array to a tag array of the processing device.

11. The method of claim 10, further comprising: based on a determination that the line state vector is present in the line state array,
    receiving a line state update;
    comparing a set address and a hit way with set and way fields in the line state array; and
    performing the one or more RMW operations to update the line state vector and increment the counter.

12. The method of claim 11, further comprising writing an encoded hit vector into a pointer array comprising a pointer to the line state array.

13. The method of claim 10, further comprising: based on a determination that the line state vector is not present in the line state array
    controlling a 2:1 mux to select a line state vector from tag array readout;
    performing the one or more RMW operations to update the line state vector and set the counter to 0; and
    writing an encoded entry index into a pointer array comprising a pointer to the line state array.

14. The method of claim 10, wherein the determination that one or more requests to the superline have completed is determined based on a value of the counter.

15. The method of claim 10, wherein the determination that one or more requests to the superline have completed comprises a determination that a line state write pass has completed.

16. The method of claim 10, wherein a line state write pass writes the line state vector to the tag array.

17. The method of claim 10, further comprising generating one or more error correction codes (ECCs) for the tag array.

18. A non-transitory, computer-readable storage medium including instructions that, when executed by a computing system, cause the computing system to:
    perform, in response to a request pertaining to a superline of a plurality of superlines of a cache, one or more read-modify-write (RMW) operations to (a) a line state vector of a line state array and (b) a counter of the line state array which tracks a quantity of pending state update requests to the superline; and
    write, based on a determination that one or more requests to the superline have completed, the line state vector from the line state array to a tag array of the computing system.

19. The storage medium of claim 18, further comprising instructions that, when executed by a computing system cause the computing system to perform operations comprising: based on a determination that the line state vector is present in the line state array,
receive a line state update;
compare a set address and a hit way with set and way fields in the line state array; and
perform the one or more RMW operations to update the line state vector and increment the counter.

20. The storage medium of claim 19, further comprising instructions that, when executed by a computing system, cause the computing system to write an encoded hit vector into a pointer array comprising a pointer to the line state array.

21. The storage medium of claim 18, further comprising instructions that, when executed by a computing system cause the computing system to: based on a determination that the line state vector is not present in the line state array,
control a 2:1 mux to select a line state vector from tag array readout;
perform the one or more RMW operations to update the line state vector and set the counter to 0; and
write an encoded entry index into a pointer array comprising a pointer to the line state array.

22. The storage medium of claim 18, wherein the determination that one or more requests to the superline have completed is determined based on a value of the counter.

23. The storage medium of claim 18, wherein the determination that one or more requests to the superline have completed comprises a determination that a line state write pass has completed.

24. The storage medium of claim 18, further comprising instructions that, when executed by a computing system, cause the computing system to perform operations comprising generating one or more error correction codes (ECCs) for the tag array.

* * * * *